Patented July 13, 1943

2,324,289

UNITED STATES PATENT OFFICE 2,324,289

REACTION PRODUCT OF ALDEHYDES AND DIAZINE DERIVATIVES

Gaetano F. D'Alelio, Pittsfield, Mass., assignor to General Electric Company, a corporation of New York No Drawing. Application May 1, 1942, Serial No. 441,372

20 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a diazine derivative corresponding to the following general formula:

I

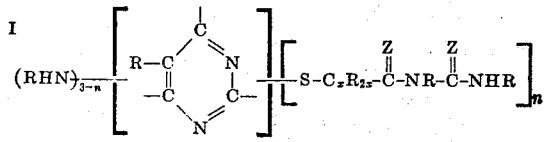

This application is a continuation-in-part of my copending application Serial No. 437,943, filed April 7, 1942, and assigned to the same assignee as the present invention.

In the above formula $n$ represents an integer and is at least 1 and not more than 3, $x$ is an integer and is at least 1 and not more than 2, Z represents a member of the class consisting of oxygen and sulfur, and R represents a member of the class consisting of hydrogen and monovalent hydrocarbon and substituted hydrocarbon radicals, more particularly halo-hydrocarbon radicals.

Illustrative examples of monovalent radicals that R in Formula I may represent are aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.,) including cycloaliphatic (e. g., cyclopentyl, cyclopentenyl, cyclohexyl, cyclohexenyl, cycloheptyl, etc.); aryl (e. g., phenyl, diphenyl or xenyl, naphthyl etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.) and their homologues, as well as those groups with one or more of their hydrogen atoms substituted by, for example, a halogen atom, more particularly a chlorine, bromine, fluorine or iodine atom. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, fluorophenyl, iodophenyl, bromotolyl, etc. Preferably R in Formula I is hydrogen. Also especially suitable for use in carrying the present invention into effect are diazine derivatives corresponding to the general formulas:

II

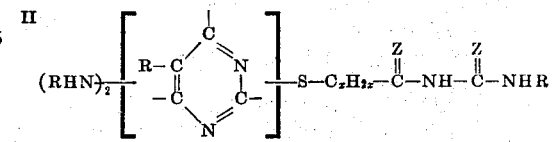

and, more particularly,

III

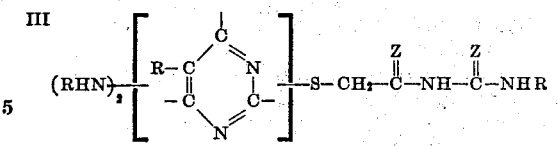

where $x$, Z and R have the same meanings as given above with reference to Formula I.

Instead of the pyrimidines (1,3-diazines) represented by the above formulas, corresponding derivatives of the 1,2-diazines and of the 1,4-diazines may be employed.

The diazine derivatives that are used in carrying the present invention into effect are more fully described and are specifically claimed in my above-mentioned copending application Serial No. 437,943. As pointed out in this copending application, a suitable method of preparing the diazine derivatives employed in practicing the present invention comprises effecting reaction between a mercapto diazine, more particularly a mercapto pyrimidine, and a mono-halogenated acylated or thionoacylated urea or thiourea in the presence of a hydrohalide acceptor, e. g., an alkali-metal hydroxide.

Specific examples of compounds embraced by Formula I (these compounds are diazinyl thio acyl or thionoacyl ureas or thioureas) that may be used in producing my new condensation products are listed below:

Monoamino pyrimidyl di-(thio acetyl urea), including 6-amino pyrimidyl-2,4 di-(thio acetyl urea) and 2-amino pyrimidyl-4,6 di-(thio acetyl urea)
Monoamino pyrimidyl di-(thio acetyl thiourea)
Monoamino pyrimidyl di-(thio thionoacetyl urea)
Monoamino pyrimidyl di-(thio thionoacetyl thiourea)
Monoamino pyrimidyl di-(alpha-thio propionyl urea)
Monoamino pyrimidyl di-(beta-thio propionyl urea)
Monoamino pyrimidyl di-(alpha-thio propionyl thiourea)

Monoamino pyrimidyl di-(beta-thio propionyl thiourea)
Monoamino pyrimidyl di-(alpha-thio thionopropionyl urea)
Monoamino pyrimidyl di-(beta-thio thionopropionyl urea)
Monoamino pyrimidyl di-(alpha-thio thionopropionyl thiourea)
Monoamino pyrimidyl di-(beta-thio thionopropionyl thiourea)
Pyrimidyl-2,4,6 tri-(thio acetyl urea)
Pyrimidyl-2,4,6 tri-(thio acetyl thiourea)
Pyrimidyl-2,4,6 tri-(thio thionoacetyl urea)
Pyrimidyl-2,4,6 tri-(thio thionoacetyl thiourea)
Pyrimidyl-2,4,6 tri-(alpha-thio propionyl urea)
Pyrimidyl-2,4,6 tri-(beta-thio propionyl urea)
Pyrimidyl-2,4,6 tri-(alpha-thio propionyl thiourea)
Pyrimidyl-2,4,6 tri-(beta-thio propionyl thiourea)
Pyrimidyl-2,4,6 tri-(alpha-thio thionopropionyl urea)
Pyrimidyl-2,4,6 tri-(beta-thio thionopropionyl urea)
Pyrimidyl-2,4,6 tri-(alpha-thio thionopropionyl thiourea)
Pyrimidyl-2,4,6 tri-(beta-thio thionopropionyl thiourea)
Diamino pyrimidyl mono-(alpha-thio propionyl urea), including 4,6-diamino pyrimidyl-2 alpha-thio propionyl urea and 2,6-diamino pyrimidyl-4 alpha-thio propionyl urea
Diamino pyrimidyl mono-(beta-thio propionyl urea)
Diamino pyrimidyl mono-(alpha-thio propionyl thiourea)
Diamino pyrimidyl mono-(alpha-thio thionopropionyl urea)
Diamino pyrimidyl mono-(beta-thio thionopropionyl urea)
Diamino pyrimidyl mono-(alpha-thio thionopropionyl thiourea)
Diamino pyrimidyl mono-(beta-thio thionopropionyl thiourea)
Diamino pyrimidyl mono-(beta-thio propionyl thiourea)
Diamino pyrimidyl mono-(alpha-thio valeryl urea)
Diamino pyrimidyl mono-(beta-thio valeryl urea)
Diamino pyrimidyl mono-(alpha-thio valeryl thiourea)
Diamino pyrimidyl mono-(beta-thio valeryl thiourea)
2,4-diamino 5-methyl pyrimidyl-6 thio acetyl urea
6-amino pyrimidyl-2,4 di-(alpha-thio butyryl urea)
6-amino pyrimidyl 2-(thio acetyl urea) 4-(beta-thio propionyl urea)
4-anilino 6-methylamino pyrimidyl-2 thio acetyl urea
4,6-diamino pyrimidyl-2 N-(beta-thio propionyl) N'-phenyl urea
4,6-di-(methylamino) 5-phenyl pyrimidyl-2 beta-thio alpha-phenyl butyryl urea
4,6-di-(anilino) pyrimidyl-2 N-(beta-thio gamma-cyclohexyl butyryl) N'-methyl thiourea
2,6-diamino 5-methyl pyrimidyl-4 N-(alpha-thiopropionyl) N,N'-diphenyl urea
6-toluido 5-ethyl pyrimidyl-2,4 di-[N-(beta-thio valeryl) N'-benzyl urea]
2-methylamino 5-phenyl pyrimidyl-4,6 di-(beta-thio alpha-chlorophenyl thionopropionyl urea)
Pyrimidyl-2,4,6 tri-[N-(thio acetyl) N'-cyclohexyl urea]
5-phenyl pyrimidyl-2,4,6 tri-(beta-thio alpha-phenyl butyryl thiourea)
6-amino pyrimidyl-2,4 di-(alpha-thio thionobutyryl thiourea)
6-amino pyrimidyl 2-(thio acetyl urea) 4-(thio thionoacetyl urea)
4,6-diamino pyrimidyl-2 alpha-thio beta-fluorophenyl propionyl urea
2,6-diamino pyrimidyl-4 beta-thio alpha-bromopropyl propionyl thiourea
4,6-di(chloroethylamino) pyrimidyl-2 thio acetyl urea
2,6-di-(fluoroanilino) pyrimidyl-4 alpha-thio propionyl urea
4,6-di-(iodotoluido) pyrimidyl-2 beta-thio propionyl thiourea
2,6-di-(bromonaphthylamino) pyrimidyl-4 alpha-thio butyryl urea
4,6-diamino 5-chlorophenyl pyrimidyl-2 thio acetyl urea It will be understood, of course, by those skilled in the art that, in those compounds listed above that are generically named, the thio groupings may be attached to any of the carbon atoms of the pyrimidine nucleus in the 2, or 4, or 6 positions. For example, the expression "diamino pyrimidyl" includes both the 4,6-diamino pyrimidyl-2 and the 2,6-diamino pyrimidyl-4 (2,4-diamino pyrimidyl-6) derivatives.

The present invention is based on my discovery that new and valuable materials of particular utility in the plastics and coating arts can be produced by effecting reaction between ingredients comprising essentially an aldehyde, including polymeric aldehydes, hydroxyaldehydes and aldehyde-addition products, and diazine derivatives of the kind embraced by Formula I, numerous examples of which have been given above and in my above-identified copending application.

It has been suggested heretofore that resins be made by condensing an aldehyde with a diamino pyrimidine having attached to one or both of the remaining carbon atoms of the pyrimidine nucleus a thioether grouping, but such resins are not entirely satisfactory for use in many applications, for instance in the production of molding compounds having a high plastic flow during molding combined with a rapid cure to an insoluble, infusible state. Surprisingly it was found that the heat-curable resinous condensation products of this invention and molding compositions made therefrom show excellent flow characteristics during a short curing cycle. This is a property that is particularly desirable in a thermosetting resin and molding compound. The molded articles have a high dielectric strength and excellent resistance to arcing. They have a good surface finish and, in general, are better than the ordinary urea-formaldehyde resins in their resistance to water. The cured resins have a high resistance to heat and abrasion and, therefore, are especially suitable for use where optimum heat- and abrasion-resistance are properties of primary importance.

In practicing my invention the initial condensation reaction may be carried out at normal or at elevated temperatures, at atmospheric, subatmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence of solvents or diluents, fillers, other natural or synthetic resinous bodies, or while admixed with other materials that also can react with the aldehydic reactant or with the diazine derivative, e. g., ketones, urea ($NH_2CONH_2$), thiourea, selenourea, iminourea (guanidine), substituted ureas, thioureas, selenoureas and iminoureas, numerous examples of which are given in various copending applications of mine, for instance in my copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, itaconic diamide, succinic diamide, phthalic diamide, the monoamide, diamide and triamide of tricarballylic acid, etc.; aldehyde-reactable diazines other than the diazine derivatives constituting the primary components of the resins of the present invention; aminotriazines, e. g., melamine, ammeline, ammelide, melem, melam, melon, numerous other examples being given in various copending applications of mine, for instance in application Serial No. 377,524, filed February 5, 1941, and in applications referred to in said copending application; phenol and substituted phenols, e. g., the cresols, the xylenols, the tertiary alkyl phenols and other phenols such as mentioned in my Patent No. 2,239,441; monohydric and polyhydric alcohols, e. g., butyl alcohol, amyl alcohol, iso-amyl alcohol, ethylene glycol, glycerine, polyvinyl alcohol, etc.; amines, including aromatic amines, e. g., aniline, etc.; and the like.

The modifying reactants may be incorporated with the diazine derivative and the aldehyde by mixing all the reactants and effecting condensation therebetween or by various permutations of reactants as described, for example, in my copending application Serial No. 363,037 with particular reference to reactions involving a urea, an aldehyde and a semi-amide of oxalic acid. For instance, I may form a partial condensation product of ingredients comprising (1) urea or melamine or urea and melamine, (2) a diazine derivative of the kind described herein and in my copending application Serial No. 437,943, for example a diamino pyrimidyl thio acetyl urea (more particularly 4,6-diamino pyrimidyl-2 thio acetyl urea and 2,6-diamino pyrimidyl-4 thio acetyl urea), a diamino pyrimidyl thio acetyl thiourea, a diamino pyrimidyl thio thionoacetyl urea, a diamino pyrimidyl thio thionoacetyl thiourea, a monoamino pyrimidyl di-(thio acetyl urea), pyrimidyl-2,4,6 tri-(thio acetyl urea), etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter I may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

Depending upon the particular conditions of reaction and the particular reactants employed, the intermediate or partial condensation products vary from clear, colorless or colored, syrupy, water-soluble liquids to viscous, milky dispersions and gel-like masses of decreased solubility in ordinary solvents, e. g., ethyl alcohol, butyl alcohol, ethylene glycol monoethyl ether, ethylene glycol, glycerine, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

Example 1

| | Parts |
|---|---|
| 4,6-diamino pyrimidyl-2 thio acetyl urea | 12.1 |
| Aqueous formaldehyde (approx. 37.1% HCHO) | 40.5 |
| Aqueous ammonia (approx. 28% NH₃) | 1.0 |
| Aqueous solution of sodium hydroxide (0.5 N) | 1.0 | were mixed and shaken continuously at room temperature for 75 minutes, yielding a clear, yellow, syrupy condensation product. When a sample of this resinous syrup was heated on a 140° C. hotplate, it bodied to a hard, infusible mass.

Example 2

| | Parts |
|---|---|
| 4,6-diamino pyrimidyl-2 thio acetyl urea | 12.1 |
| Urea | 15.0 |
| Aqueous formaldehyde (approx. 37.1% HCHO) | 48.6 |
| Aqueous ammonia (approx. 28% NH₃) | 3.0 |
| Aqueous solution of sodium hydroxide (0.5 N) | 1.6 |
| Chloroacetamide (monochloroacetamide) | 0.4 | were heated together under reflux at the boiling temperature of the mass for 7 minutes. The chloroacetamide was now added and refluxing was continued for an additional 1 minute to cause the chloroacetamide to intercondense with the partial condensation product of urea, 4,6-diamino pyrimidyl-2 thio acetyl urea and formaldehyde. A molding (moldable) composition was made from the resulting resinous syrup by mixing therewith 27 parts alpha cellulose in flock form and 0.1 part of a mold lubricant, specifically zinc stearate. The wet molding compound was dried at room temperature until sufficient moisture had been removed to provide a material that could be molded satisfactorily. A sample of the dried and ground molding compound was molded for 5 minutes at 140° C. under a pressure of 9,000 pounds per square inch. The molded piece had a well-knit, highly cured and homogeneous structure. It had good resistance to water as shown by the fact that it absorbed only 4.2% by weight of water when immersed in boiling water for 15 minutes, followed by immersion in cold water for 5 minutes. The molding compound had very good flow characteristics during molding as indicated by the amount of flash on the molded piece and the evenness or homogeneity of structure of the molded article.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, glycine, sulfamic acid, citric diamide, phenacyl chloride, etc.). Other examples of active and latent curing catalysts and of curing reactants that may be employed to accelerate or to effect the curing of the thermosetting or potentially thermosetting resins of this example, as well as examples that follow, are given in various copending applications of mine, for instance in copending applications Serial No. 346,962, filed July 23, 1940, and Serial No. 354,395, filed August 27, 1940, both of which applications are assigned to the same assignee as the present invention.

Example 3

| | Parts |
|---|---|
| 4,6-diamino pyrimidyl-2 thio acetyl urea | 12.1 |
| Melamine | 31.5 |
| Aqueous formaldehyde (approx. 37.1% HCHO) | 48.6 |
| Aqueous ammonia (approx. 28% NH₃) | 2.0 |
| Aqueous solution of sodium hydroxide (0.5 N) | 2.5 |
| Chloroacetamide | 0.4 |

All of the above ingredients with the exception of the chloroacetamide were heated together under reflux at the boiling temperature of the mass for 12 minutes. The chloroacetamide was now added and the resulting resinous syrup immediately was mixed with 42 parts alpha cellulose and 0.2 part zinc stearate. The wet molding composition thereby produced was dried at room temperature as described under Example 2. A sample of the dried and ground molding compound was molded into the form of a disk, using a molding time of 5 minutes, a molding temperature of 140° C. and a molding pressure of 6,750 pounds per square inch. The molded disk was extracted hot from the mold and did not warp or become distorted upon cooling to room temperature. The molded piece was well cured and had a well-knit and homogeneous structure. It had excellent resistance to water as shown by the fact that it absorbed only 0.44% by weight of water when tested for its water-resistance characteristics as described under Example 2. The molding compound showed good plastic flow during molding.

Example 4

| | Parts |
|---|---|
| 4,6-diamino pyrimidyl-2 thio acetyl urea | 12.1 |
| Dimethylol urea (commercial grade containing approx. 11% by weight of water) | 54.0 |
| Aqueous ammonia (approx. 28% NH₃) | 3.5 |
| Aqueous solution of sodium hydroxide (0.5 N) | 2.5 |
| Water | 72.5 |
| Chloroacetamide | 0.4 |

All of the above ingredients with the exception of the chloroacetamide were heated together under reflux at the boiling temperature of the mass for 6 minutes. The chloroacetamide was now added and refluxing was continued for an additional 8 minutes. A molding compound was prepared by mixing the resulting resinous syrup with 48.7 parts alpha cellulose and 0.2 part zinc stearate. The wet molding compound was dried at room temperature as described under Example 2. A sample of the dried and ground molding compound was molded into the form of a disk as described under Example 3. The molded disk was well cured and had a well-knit and homogenous structure. The molding compound showed good plastic flow during molding.

Example 5

| | Parts |
|---|---|
| 4,6-diamino pyrimidyl-2 thio acetyl urea | 12.1 |
| 1-phenyl guanazole | 17.5 |
| Aqueous formaldehyde (approx. 37.% HCHO) | 48.6 |
| Aqueous ammonia (approx. 28% NH₃) | 1.5 |
| Aqueous solution of sodium hydroxide (0.5 N) | 1.5 |
| Chloroacetamide | 0.4 | were heated together in an open reaction vessel on a hotplate for 2 minutes. A molasses-like syrup formed and this syrup immediately was mixed with 27 parts alpha cellulose and 0.1 part zinc stearate. The wet molding compound thereby produced was dried at room temperature as described under Example 2. A sample of the dried and ground molding compound was molded into the form of a disk as described under Example 3. The molded disk was well cured. It had good cohesive characteristics but, in general, it was not quite so homogeneous nor so well knitted together as the molded articles of Examples 2, 3 and 4. The plastic flow of the compound during molding likewise was not quite so good as that of the molding compounds of Examples 2, 3 and 4. The resistance of the molded article to water was very good, as shown by the fact that it absorbed only 3.74% by weight of water when tested for its water-resistance characteristics as described under Example 2.

Example 6

| | Parts |
|---|---|
| 4,6-diamino pyrimidyl-2 thio acetyl urea | 4.84 |
| Furfural | 19.6 |
| Aqueous ammonia (approx. 28% NH₃) | 0.22 |
| Aqueous solution of sodium hydroxide (0.5 N) | 0.8 | were heated together under reflux at the boiling temperature of the mass for 10 minutes, yielding a resinous syrup that hardened to an infusible solid when a sample of it was heated on a 140° C. hotplate. The cure of the resin to the infusible state was accelerated by adding glycine, chloroacetamide, aminoacetamide hydrochloride and other curing agents such as mentioned under Example 2 to the syrupy condensation product, followed by heating on a 140° C. hotplate. The resinous composition of this example is suitable for use in the preparation of molding compounds and molded articles.

Example 7

| | Parts |
|---|---|
| 4,6-diamino pyrimidyl-2 thio acetyl urea | 4.84 |
| Acrolein | 11.6 |
| Aqueous solution of sodium hydroxide (0.5 N) | 0.8 |
| Water | 17.2 | were heated together under reflux at the boiling temperature of the mass for 10 minutes. When a sample of the resinous material produced in this manner was heated on a 140° C. hotplate, it formed a pliable but infusible film. However, the cure of the resin could be advanced further by the addition of phthalic monoamide, chloroacetamide, phenacyl chloride and other curing agents such as mentioned under Example 2 either to the syrupy condensation product or to the dehydrated resin, followed by heating on a 140° C. hotplate. The resinous product of this example may be used in the preparation of liquid coating materials or in the manufacture of molding compounds.

Example 8

| | Parts |
|---|---|
| 4,6-diamino pyrimidyl-2 thio acetyl urea | 4.84 |
| Butyl alcohol | 14.8 |
| Aqueous formaldehyde (aprox. 37.1% HCHO) | 16.2 |
| Aqueous ammonia (approx. 28% NH₃) | 0.25 |
| Aqueous solution of sodium hydroxide (0.5N) | 0.8 | were heated together under reflux at the boiling temperature of the mass for 10 minutes. The resulting resinous syrup was dehydrated by heating it on a steam plate. The dehydrated syrup was found to be soluble in ethylene glycol, ethylene glycol monoethyl ether and benzyl alcohol. The solubility and film-forming characteristics of the resinous composition of this example make it especially suitable for use in the preparation of coating and impregnating compositions. For example, it may be used in the production of spirit and baking varnishes. It may be used as a modifier of varnishes of the aminoplast and alkyd-resin types.

Example 9

| | Parts |
|---|---|
| 4,6-diamio pyrimidyl-2 thio acetyl urea | 4.84 |
| Acetamide | 2.36 |
| Aqueous formaldehyde (approx. 37.1% HCHO) | 16.2 |
| Aqueous ammonia (approx. 28% NH₃) | 0.25 |
| Aqueous solution of sodium hydroxide (0.5 N) | 0.8 | were heated together under reflux at the boiling temperature of the mass for 7 minutes, yielding a resinous syrup that formed a pliable resin film when a sample of the syrup was heated on a 140° C. hotplate. The resinous composition of this example is suitable for use as a modifier of less plastic resins to improve their flow or plasticity characteristics. It also may be employed in the preparation of thin, molded plastic materials, for example flexible covers and novelty articles that are made in thin cross-sections.

Example 10

| | Parts |
|---|---|
| 4,6-diamino pyrimidyl-2 thio acetyl urea | 4.84 |
| Diethyl malonate | 2.4 |
| Aqueous formaldehyde (approx 37.1% HCHO) | 16.2 |
| Aqueous ammonia (approx. 28% NH₃) | 0.25 |
| Aqueous solution of sodium hydroxide (0.5 N) | 0.8 | were heated together under reflux at the boiling temperature of the mass for 10 minutes. Upon heating a sample of the resulting resinous syrup on a 140° C. hotplate, it bodied to a thermoplastic resin that is suitable for use as a flow extender of less plastic resins as described above with reference to the product of Example 9.

Example 11

| | Parts |
|---|---|
| 4,6-diamino pyrimidyl-2 thio acetyl urea | 4.84 |
| Glycerine | 1.84 |
| Aqueous formaldehyde (approx. 37.1% HCHO) | 16.2 |
| Aqueous ammonia (approx. 28% NH₃) | 0.25 |
| Aqueous solution of sodium hydroxide (0.5 N) | 0.8 | were heated together under reflux at the boiling temperature of the mass for 7 minutes. The resulting resinous syrup was dehydrated on a steam plate. The dehydrated syrup was soluble in ethylene glycol, ethylene glycol monoethyl ether and benzyl alcohol. When the dehydrated syrup was treated with a curing agent, specifically a small amount of hydrochloric acid, and the resulting product baked in film form on a glass surface for several hours at 70° C., a baked film that was hard, transparent, smooth and water-resistant was obtained. The resinous composition of this example is especially suitable for use in the manufacture of coating and impregnating compositions.

*Example 12*

| | Parts |
|---|---|
| 4,6-diamino pyrimidyl-2 thio acetyl urea | 4.84 |
| Polyvinyl alcohol | 0.88 |
| Aqueous formaldehyde (approx. 37.1% HCHO) | 16.2 |
| Aqueous ammonia (approx. 28% NH₃) | 0.25 |
| Aqueous solution of sodium hydroxide (0.5 N) | 0.8 | were heated together under reflux at the boiling temperature of the mass for 6 minutes. When a sample of the resulting resinous syrup was heated on a 140° C. hotplate, it formed an infusible sheet that did not adhere to the hotplate. Less flexible films, more advanced in cure are produced by similarly heating samples of the syrup in which has been incorporated chloroacetamide, glycine or other curing agents such as mentioned under Example 2. When a sample of the syrupy resin was applied to a glass plate, which then was baked for several hours at 70° C., a hard, adhering, opaque, smooth, white, water-resistant film was formed on the plate. The resinous composition of this example may be used in the production of molding compositions and molded articles. It also may be employed in the manufacture of various liquid coating and impregnating compositions.

*Example 13*

| | Parts |
|---|---|
| 4,6-diamino pyrimidyl-2 thio acetyl urea | 12.1 |
| Aqueous formaldehyde (approx. 37.1% HCHO) | 40.5 |
| Aqueous ammonia (approx. 28% NH₃) | 1.0 |
| Aqueous solution of sodium hydroxide (0.5 N) | 1.0 |
| Chloroacetamide | 0.2 |

All of the above ingredients with the exception of the chloroacetamide were heated together under reflux at the boiling temperature of the mass for 10 minutes. The chloroacetamide was now added and refluxing was continued for an additional 4 minutes. A molding composition was made from the resulting resinous syrup by mixing therewith 18.3 parts alpha cellulose and 0.1 part zinc stearate. The wet molding compound was dried at room temperature as described under Example 2. A sample of the dried and ground molding compound was molded into the form of a disk, using a molding time of 5 minutes, a molding temperature of 140° C. and a molding pressure of 4,500 pounds per square inch. The molded disk was extracted hot from the mold and did not warp or become distorted upon cooling to room temperature. The molded piece was well cured throughout and had a well-knit and homogeneous structure. The water resistance of the molded article was good, as shown by the fact that it absorbed only 4.9% by weight of water when tested for its water-resistance characteristics as described under Example 2. The molding compound showed good plastic flow during molding.

It will be understood, of course, by those skilled in the art that my invention is not limited to condensation products obtained by reaction of ingredients comprising an aldehyde and the specific diazinyl compound named in the above illustrative examples. Thus, instead of 4,6-diamino pyrimidyl-2 thio acetyl urea I may use, for example, 2,6-diamino pyrimidyl-4 thio acetyl urea, a diamino pyrimidyl thio acetyl thiourea, a diamino pyrimidyl thio thionoacetyl urea, a diamino pyrimidyl thio thionoacetyl thiourea, a monoamino pyrimidyl di-(thio acetyl urea), pyrimidyl-2,4,6 tri-(thio acetyl urea), or any other pyrimidine derivative (or mixture thereof) of the kind embraced by Formula I, numerous examples of which compounds have been given hereinbefore and in my copending application Serial No. 437,943.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, crotonaldehyde, octaldehyde, benzaldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea, substituted ureas, thioureas, selenoureas and iminoureas (numerous examples of which are given in my copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminotriazines, etc. Particularly good results are obtained with active methylene-containing bodies such as a methylol urea, more particularly mono- and di-methylol ureas, a methylol aminotriazine, more particularly a methylol melamine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range, but ordinarily the reactants are employed in an amount corresponding to at least one mol of the aldehyde, specifically formaldehyde, for each mol of the diazine derivative. Thus, I may use, for example, from one to eight or nine or more mols of an aldehyde for each mol of diazine derivative. Good results are obtained in manufacturing thermosetting resinous compositions using from about 2¼ to 4½ mols aldehyde, specifically formaldehyde, for each mol of diazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 3 or 4 up to 15 or 20 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, benzene sulfonamides, toluene sulfonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in my copending application Serial No. 289,273, filed August 9, 1939, now Patent No. 2,281,559, issued May 5, 1942, and Serial No. 400,649, filed July 1, 1941, now Patent No. 2,294,873, issued September 1, 1942; and others.

The modifying bodies also may take the form of high molecular weight bodies with or without resinous characteristics, for example, hydrolyzed wood products, formalized cellulose derivatives, lignin, protein-aldehyde condensation products, aminotriazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a diazine derivatve of the kind herein described and an aldehyde, specifically formaldehyde, I may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, polyacrylic, oxalic, methacrylic, polymethacrylic, malonic, succinic, adipic, malic, maleic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compostilons, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire and baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be employed as impregnants for electrical coils and for other electrically insulating applications.

What I claim as new and desire to secure by Letters Patent of the United States is:

1. A composition of matter comprising the reaction product of ingredients comprising an aldehyde and a compound corresponding to the general formula

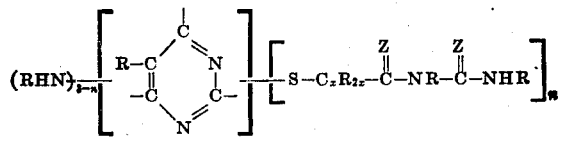

where $n$ represents an integer and is at least 1 and not more than 3, $x$ is an integer and is at least 1 and not more than 2, Z represents a member of the class consisting of oxygen and sulfur, and R represents a member of the class consisting of hydrogen and monovalent hydrocarbon and halo-hydrocarbon radicals.

2. A composition as in claim 1 wherein the aldehyde is formaldehyde.

3. A composition as in claim 1 wherein the reaction product is an alkaline-catalyzed reaction product of the stated components.

4. A composition of matter comprising the reaction product of ingredients comprising an aldehyde and a compound corresponding to the general formula

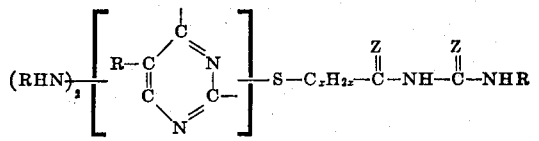

where $x$ is an integer and is at least 1 and not more than 2, Z represents a member of the class consisting of oxygen and sulfur, and R represents a member of the class consisting of hydrogen and monovalent hydrocarbon and halo-hydrocarbon radicals.

5. A composition of matter comprising the product of reaction of ingredients comprising an aldehyde and a compound corresponding to the general formula

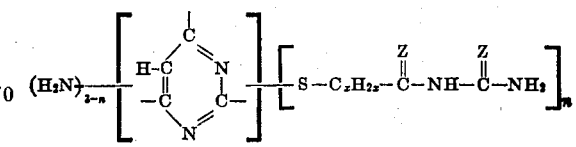

where $n$ represents an integer and is at least 1 and not more than 3, $x$ is an integer and is at least 1 and not more than 2, and Z represents a member of the class consisting of oxygen and sulfur.

6. A composition as in claim 5 wherein Z represents oxygen.

7. A heat-curable resinous composition comprising a heat-convertible condensation product of ingredients comprising formaldehyde and a compound corresponding to the general formula

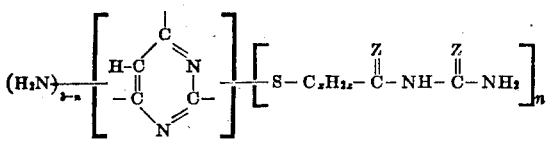

where n represents an integer and is at least 1 and not more than 3, x is an integer and is at least 1 and not more than 2, and Z represents a member of the class consisting of oxygen and sulfur.

8. A product comprising the cured resinous composition of claim 7.

9. A composition comprising the resinous product of reaction of ingredients comprising an aldehyde and pyrimidyl-2,4,6 tri-(thio acetyl urea).

10. A composition comprising the resinous product of reaction of ingredients comprising an aldehyde and a mono-amino pyrimidyl di-(thio acetyl urea).

11. A composition comprising the resinous product of reaction of ingredients comprising an aldehyde and a diamino pyrimidyl thio acetyl urea.

12. A composition comprising the product of reaction of ingredients comprising a urea, an aldehyde and a compound corresponding to the general formula

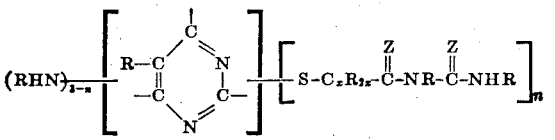

where n represents an integer and is at least 1 and not more than 3, x is an integer and is at least 1 and not more than 2, Z represents a member of the class consisting of oxygen and sulfur, and R represents a member of the class consisting of hydrogen and monovalent hydrocarbon and halo-hydrocarbon radicals.

13. A composition as in claim 12 wherein the urea component is the compound corresponding to the formula $NH_2CONH_2$ and the aldehyde is formaldehyde.

14. A composition comprising the product of reaction of ingredients comprising an alcohol, an aldehyde and a compound corresponding to the general formula

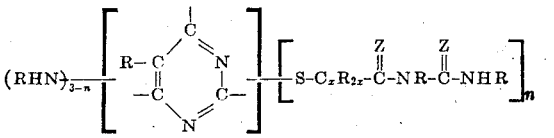

where n represents an integer and is at least 1 and not more than 3, x is an integer and is at least 1 and not more than 2, Z represents a member of the class consisting of oxygen and sulfur, and R represents a member of the class consisting of hydrogen and monovalent hydrocarbon and halo-hydrocarbon radicals.

15. A composition comprising the product of reaction of ingredients comprising an aminotriazine, an aldehyde and a compound corresponding to the general formula

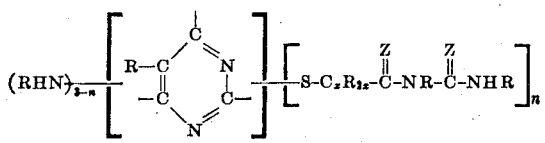

where n represents an integer and is at least 1 and not more than 3, x is an integer and is at least 1 and not more than 2, Z represents a member of the class consisting of oxygen and sulfur, and R represents a member of the class consisting of hydrogen and monovalent hydrocarbon and halo-hydrocarbon radicals.

16. A heat-curable composition comprising the heat-convertible resinous reaction product of (1) a partial condensation product of ingredients comprising formaldehyde and a compound corresponding to the general formula

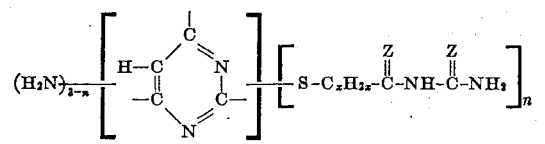

where n represents an integer and is at least 1 and not more than 3, x is an integer and is at least 1 and not more than 2, and Z represents a member of the class consisting of oxygen and sulfur, and (2) a curing reactant.

17. A composition as in claim 16 wherein the curing reactant is a chlorinated acetamide.

18. A resinous composition comprising the product of reaction of ingredients comprising urea, formaldehyde and 4,6-diamino pyrimidyl-2 thio acetyl urea.

19. A composition comprising the resinous product of reaction of a plurality of reactants including melamine, formaldehyde and 4,6-diamino pyrimidyl-2 thio acetyl urea.

20. The method of preparing new synthetic compositions which comprises effecting reaction between ingredients comprising an aldehyde and a compound corresponding to the general formula

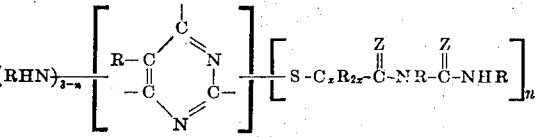

where n represents an integer and is at least 1 and not more than 3, x is an integer and is at least 1 and not more than 2, Z represents a member of the class consisting of oxygen and sulfur, and R represents a member of the class consisting of hydrogen and monovalent hydrocarbon and halo-hydrocarbon radicals.

GAETANO F. D'ALELIO.

Certificate of Correction

Patent No. 2,324,289.　　　　　　　　　　　　　　　　　　　　July 13, 1943.

GAETANO F. D'ALELIO

It is hereby certified that errors appear in the printed specification of the above numbered patent requiring correction as follows: Page 2, second column, line 11, for "4,6-di(chloroethylamino)" read *4,6-di-(chloroethylamino)*; page 5, first column, line 5, for "37.%" read *37.1%*; and second column, line 5, for "aprox." read *approx.*; line 27, for "diamio" read *diamino*; page 7, second column, line 2, for "compostiions" read *compositions*; lines 50 to 55, for that portion of the formula reading

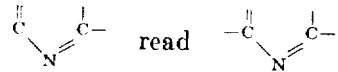

and that the said Letters Patent should be read with these corrections therein that the same may conform to the record of the case in the Patent Office.

Signed and sealed this 7th day of September, A. D. 1943.

[SEAL]

HENRY VAN ARSDALE,
*Acting Commissioner of Patents.*